United States Patent [19]

Neumann et al.

[11] Patent Number: 4,462,029
[45] Date of Patent: Jul. 24, 1984

[54] COMMAND BUS

[75] Inventors: Leopold Neumann, Lexington; Gerald N. Shapiro, Newton; Bruno A. Mattedi, Andover, all of Mass.

[73] Assignee: Analogic Corporation, Wakefield, Mass.

[21] Appl. No.: 100,710

[22] Filed: Dec. 6, 1979

[51] Int. Cl.[3] .............................................. H04Q 9/00
[52] U.S. Cl. .................................. 340/825.5; 364/900
[58] Field of Search ... 364/200 MS File, 900 MS File; 340/825.5, 825.51

[56] References Cited

U.S. PATENT DOCUMENTS

| | | | |
|---|---|---|---|
| 4,085,448 | 4/1978 | Kogge | 364/900 |
| 4,151,593 | 4/1979 | Jenkins et al. | 364/200 |
| 4,157,587 | 6/1979 | Joyce et al. | 364/200 |
| 4,167,779 | 9/1980 | Sullivan et al. | 364/200 |
| 4,181,934 | 1/1980 | Marenin | 364/200 |

OTHER PUBLICATIONS

INTEL The 8080/8085 Microprocessor Book, A. Wiley-Interscience Publication, New York, 1980.
PDP II Peripherals and Interfacing Handbook, Unibus Theory and Operation, Copyright 1971, Digital Equipment Corporation, Maynard, Massachusetts.

*Primary Examiner*—Felix D. Gruber
*Assistant Examiner*—John G. Mills
*Attorney, Agent, or Firm*—Weingarten, Schurgin, Gagnebin & Hayes

[57] ABSTRACT

A system for reducing a fixed number of data buses and connections in a computer system having a number of modules connected to the data bus utilizing the internal circuits of the various processing units or modules to transmit data from one unit to another via the data bus when the normal function of a unit can be interrupted, with the data routing and module control being under the control of a command bus.

10 Claims, 4 Drawing Figures

COMMAND BUS

FIELD OF INVENTION

This invention relates to computers and more particularly to the control of modules within a computer through the use of a command bus to perform switching and diagnostic functions.

BACKGROUND OF THE INVENTION

Computers in general utilize a number of individual processing modules or sections, each accomplishing a different part or task related to solving a problem. These processing modules may include a control module, an input-output controller, an arithmetic unit, a data memory unit, and buffering between the units. In the past, the modules have been interconnected with a number of data buses which carry information and commands to and from the various modules in the computer. In order to achieve a certain amount of uniformity, each of the modules is provided with a fixed number of input/output terminals, standardized so as to be able to accommodate a fixed number of data buses.

In the past, in order to achieve flexibility, enough data buses were provided so that all computer functions could be accommodated and so that communications between each of the processing parts would not be limited. This resulted in an overly large number of data buses and/or connections because some of the modules simply had no need for all of the data buses. Moreover, some of the modules use some data buses only infrequently. This is because an individual module for most of its computational task requires only a small sub-set of data buses.

Put another way, most computer processing can be characterized by a very simple connection diagram or circuit between the processing units. However, in a small, infrequently-occuring, but important class of computational problems a more complex bus structure is required. In order for computational machines to accommodate such significant but not usual computational problems, it is standard practice in the industry to provide an overly large number of buses to accommodate a worse case situation.

Reduction of number of buses and interconnects is important for the following reasons:

It will be appreciated that for some of the modules there will be many unused or infrequently-used input/output terminals. Thus reduction of buses and interconnects is possible. Moreover, in any computational processing system the lower the number of connections and buses, the higher will be the reliability of the machine. Not only is reliability based upon the number of interconnects, but it is also based upon the amount of cross-talk between data buses. In order to increase reliability, it is important to reduce the number of infrequently-used data buses and connections.

Additionally, as the number of components that can be placed on a given semi-conductor chip increases, there is a premium on designs which can reduce the number of input/output pins or connections to each chip. This is because in the end the size of the chip itself limits the number of input/output pins.

Another pressing problem in the utilization of computers is the ability to test the modules within the computer so as to trouble-shoot. One of the purposes of utilizing a diagnostic procedure is to ascertain, when a problem arises, whether it is due to a hardware problem or a software problem. Trouble-shooting normally requires being able to read out the output of a given module or given set of circuits within a module. This may be accomplished by reading out the values of stored information within the module.

Normal testing procedures are hampered because the computer modules do not function in the same way when being tested as they do when they are in actual operation. For instance, most diagnostic tests require additional built-in circuits wich monitor the operation of the module. In this manner, machine operation is "simulated".

Simulation is, in a sense, the simplified running of the computer, and therefore, the diagnostic test which tests for pre-determined conditions can run rapidly and hopefully all-inclusively. However, in the simulation of any machine, there is not necessarily a correspondence between a test of the simulated machine as opposed to the test of the real machine. This in turn results in errors which cannot be diagnosed with present systems.

What this means is that the test program or diagnostic does not monitor the normal operation of the computer, and therefore introduces an uncertainty as to whether any problem is due to a fault in the testing circuits or a fault in the computer hardware/software implementation. Put differently, the diagnostic testing of computers has utilized programs and apparatus which are in effect add-on circuits, and it is the condition of these add-on circuits which are introduced to indicate the status of the circuits which are actually doing the computations. Thus, in diagnostic testing, one normally introduces a change in the operation of the machine from its normal mode to the diagnostic mode. The problem with changing the mode of operation of the machine is that in all instances it is not entirely clear when running in the diagnostic mode that the machine will function properly in a normal running mode.

Moreover, it is highly desirable in software diagnostics that one be able to in effect stop the machine at a variety of different places in order to ascertain the condition of the machine at that particular point in time, and it is desirable to be able to do this without disturbing the normal operational mode of the machine. This allows for diagnosis of software errors on the actual machine and eliminates the need for having a simulation of the machine.

SUMMARY OF THE INVENTION

The subject system both reduces the numbers of data buses and connections, and eliminates the need for simulation for diagnostic testing by utilizing the internal circuits of the various processing units or modules to connect one unit to another in a prescribed fashion, and by using a command bus to control this process.

In accordance with one aspect of the subject invention, routing of signals to and from individual processing units is accomplished not through the utilization of fixed buses which are hard-wired to the modules, but rather the circuits within a processing unit are utilized, either when free, or on a cycle-stealing basis, for the passage of information to and from predetermined modules. These circuits may include transceivers, gates, registers or storage devices. This routing is made possible with the realization that certain connections only need occur for a small percent of the processing time. This is also made possible because of the realization that the internal circuits of a module can be used to connect buses together, either when that module is idle or on a cycle stealing basis. More specifically, the circuit link is accomplished by the existing buses and the idle circuits within a module. If a connection is to be made and there is no appropriate idle module, the processing is interrupted.

This result is achieved through the utilization of a command bus which, in essence, configures the modules so as to permit the transit of information through circuits internal to the modules.

The result is that a piece of stored information in one module can be moved to a storage location in another module without requiring a direct bus structure, but rather by utilizing an existing bus which already connects modules together. This, a module, instead of performing its normal function, serves as a routing box or conduit for the information. The modules, in order to function in this fashion, are controlled by commands on the control bus so that maximum advantage can be taken of a particular processing problem. This means that the routing is programmable and variable in accordance with the tasks to be performed.

The result of the utilization of a command bus in such a fashion is that specialized commands can be placed on the command bus which will also result in the reading out of the states of the modules or their circuits. Thus, no additional simulation structure or circuitry is necessary for diagnostic testing. For a diagnostic test, the appropriate command is merely placed on the command bus to freeze all or part of the computer operations and read out that particular data which is in question.

Moreover, the command bus structure allows one to freeze only that portion of the computer which is absolutely necessary in order to move the information in question from one place to another. For instance, assuming a problem in the arithmetic unit, read out of memory to a utilization device or display, need not be stopped or frozen. Moreover, if the problem appears to be in the input/output bus structure, computations may continue in the arithmetic units without interruption whereas modules associated with the I/O bus, such as data memory, etc., may be frozen so as to isolate the problem.

One of the benefits of utilizing such a command bus structure and minimum numbers of data buses is that even with a fixed data bus structure, one can update the modules or processing units attached to the data bus. This is due to the programmable nature of the module by virtue of command bus control. For instance, if one wished to increase the number of storage elements in a particular module, rather than altering or adding to the existing data bus structure, all that would be necessary would be to change the command bus code.

Thus, with the subject command bus, it is possible to accomplish both objectives of minimizing numbers of data buses and connections, and also permit diagnostic testing without simulating machine operation or without shutting down the entire computer system.

BRIEF DESCRIPTION OF THE DRAWINGS

These and other features of the present invention are more fully set forth below in the detailed description of the preferred embodiment presented below for the purpose of illustration, not by way of limitation, and in the accompanying drawing of which.

DETAILED DESCRIPTION

Figure 1:
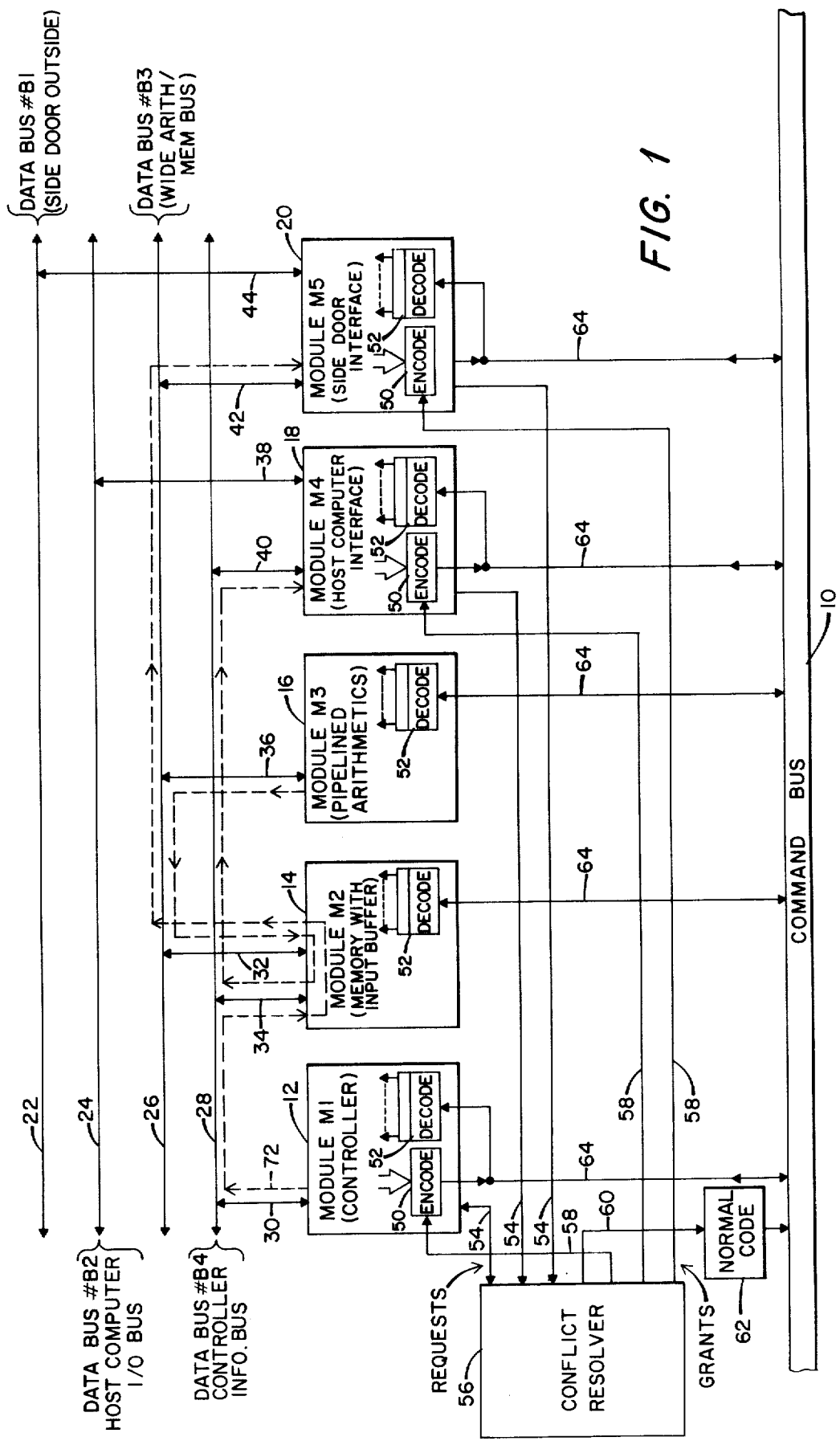
FIG. 1 is a block diagram illustrating the command bus structure and its control of a number of modules which are connected to a minimum number of data buses.

Referring now to FIG. 1, a command bus 10 is provided for a number of modules 12, 14, 16, 18 and 30, which, in this case, are variously connected to data buses 22, 24, 26 and 28. The modules are labeled as follows: module 12 is labeled module M1, which may be a controller; module 14 is labeled Module M2 and may be a memory with an input buffer; module 16 is labeled M3 and may be a pipelined arithmetic unit; module 18 is labeled M4 and may be host computer interface; and, module 20 is labeled Module M5 and may be a "side-door" interface. The term "side-door" refers to using a bus other than the host computer bus to communicate with computer peripherals.

The data buses 22 through 28 are labeled B1 through B4 respectively, which refers to respectively a "side-door" outside bus, a host computer I/O bus, a wide arithmetic unit/memory bus, and a controller information bus.

With this nomenclature, it will be appreciated that controller Module M1 is coupled to bus B4 via hardware link 30. Module M2 is connected to buses B3 and B4 via hardwire links 32 and 34. Module M3 is connected to bus B3 via hardwire link 36. Module M4 is connected to buses B2 and B4 via hardwire links 38 and 40. Finally, Module M5 is connected to buses B3 and B1 via hardwire links 42 and 44.

As mentioned hereinbefore, some of the modules may have an encoding and decoding function, whereas some modules require a decoding function only.

As can be seen from the diagram of FIG. 1, Module M1 includes an encoding unit 50 and a decoding unit 52, whereas Modules M2 and M3 require only decoding units 52 as illustrated. Module M4 has encoding and decoding units 50 and 52 as does Module M5.

It can therefore be seen that the controller, the host computer interface and the "side-door" interface are capable of both loading instructions onto the command bus 10 as well as receiving instructions from the command bus. Ordinarily the memory unit and the arithmetic unit do not have the encoding capability because it is data from these units which is ordinarily to be shifted around and it is unusual that these units have in and of themselves any control function normally associated with them. Thus, the subject invention is not limited to modules which have both the encode and decode functions.

Each of the modules having an encoding unit have a line 54 which runs from the unit to a conflict resolver 56, which may be of the type utilizing a Texas Instrument Model 5287 IC wich is a 4 bit cascadable priority register. As an example, the priority device may operate such that the host/interface always has priority over the controller. The controller then has priority over the side door module. The side door module then has priority over the normal mode of operation. Signals on lines 54 indicate that a particular module is requesting access to the command bus so as to be able to accomplish some signal routing task. The conflict resolver unit decides which of the requests will be honored and at what time, and enables the encoding units of the particular modules in accordance with signals over lines 58. Should there be no requests on lines 54, then conflict resolver unit 56 produces an output signal over line 60 to a normal code unit 52 which applies normal command codes to command bus 10. Note, command bus codes are applied in parallel to the decode units of all modules via lines 64 as illustrated.

Table I presented herebelow, indicates normal connections between the various modules, also indicating the bus utilized to provide the inter-connection. Also listed in table I are other communications which are to be supplied on an "as needed" basis between the modules indicated.

TABLE I

| NORMAL CONNECTIONS | |
| --- | --- |
| M1 ⟶ M2 via B4 | Controller sets up MEM/ARITH Operation Information |
| M2 ⇄ M3 via B3 | MEM/ARITH computation |
| M4 ⟵ B2 | Host Bus Monitoring, Waiting for Things to Happen |
| M5 ⟶ B1 | Side Door Bus Waiting, For Data Acceptance or Transmission |
| OTHER COMMUNICATIONS | |
| M1 ⟶ M4 | Controller Initiates Host Bus Operation without affecting M2 M3 -e.g. MEM/ARITH Operations |
| M1 ⇄ M4 | Controller supplies data to Host or accepts data from Host without affecting M2 M3 e.g. MEM/ARITH Operation |
| M2 ⇄ M5 (Direct) | Side-Door cycle-steals Memory Interrupting arithmetic (M3), but not affecting controller (M1) |
| M4 ⇄ M3 (Indirect via M2) | Host inspects arithmetic storage values, interrupting controller (M1) MEM/ARITH (M2-M3) |
| M1 ⇄ M5 (Indirect via M2) | Controller initializes side door operation, using Memory (M2) as conduit interrupting MEM/ARITH (M2-M3) operation |
| BASIC SAVINGS | |
| The following buses are not required | B4 ⇄ M3 |
| | B4 ⇄ M5 |
| | B3 ⇄ M1 |
| | B3 ⇄ M4 |

Of particular interest are the indirect connections M4⇄M3 via M2 and M1⇄M5 or vice versa, via M2. In these situations, the M2 module is utilized as a routing or switching circuit in which its usual memory function is interrupted so as to provide the conduit required. This connection or conduit may be provided by gating circuits, or may be provided by transceivers, registers or other storage devices appropriately clocked and enabled.

Taking for example the task of sending data to a pipeline arithmetic unit from the host computer interface, it will be seen that there is no direct bus to accomplish this function. Because the arithmetic unit is connected via hardwire 36 link to bus B3 whereas the host computer interface module is connected to buses B4 and B2.

In order to connect Module M3 to Module M4, Module M3 output is connected to bus B3 and thence to Module M2. During an appropriate clocking cycle, decode unit 52 of Module M2 shuts down the memory function of this module and utilizes the module to conduct information over hardwire link 32 to hardwire link 34 which then routes this information over hardwire link 40 via bus B4 to Module M4. This entire process is illustrated by dotted line 70. It will be appreciated that the amount of time necessary to connect Module M3 via Module M2 to Module M4 in essence would take longer than providing a hardwired or fixed bus between the Modules. However, in terms of the amount of time that this particular connection is called for, the switching time through Module M2 is minimal. It will be appreciated that ordinarily Module M3 is connected to the arithmetic memory unit bus and not to the host computer interface bus.

As indicated in Table I, in the M4-M3 transfer, the host inspects the arithmetic storage values interrupting the operation of controller M1 and the memory and arithmetic units M2 and M3, while utilizing M2 as a conduit.

In the case where the controller initializes the "side-door" operation, Module M2 may again be used as conduit, with the interruption of the memory and arithmetic units M2 and M3 during this operation. In this case, the output of Module M1 is applied via hardwire link 30 to bus B4 which is connected via hardware link 34 to Module M2. Module M2 serves as a switching conduit which places the B4 information onto bus B3 via hardware link 32. This information is passed via hardwire link 42 to Module M5. The entire process is illustrated by dotted line 72.

It will be appreciated from Table I, is that there is a basic savings in that the following buses are not required: B4-M3; B4-M5; B3-M1; and B3-M4.

Having described the indirect connection system, it will be appreciated that the command bus encoding and decoding switching structure permits diagnostic testing without the utilization of simulation, provided that the command bus codes allow access to key storage information within each module.

Figure 2:
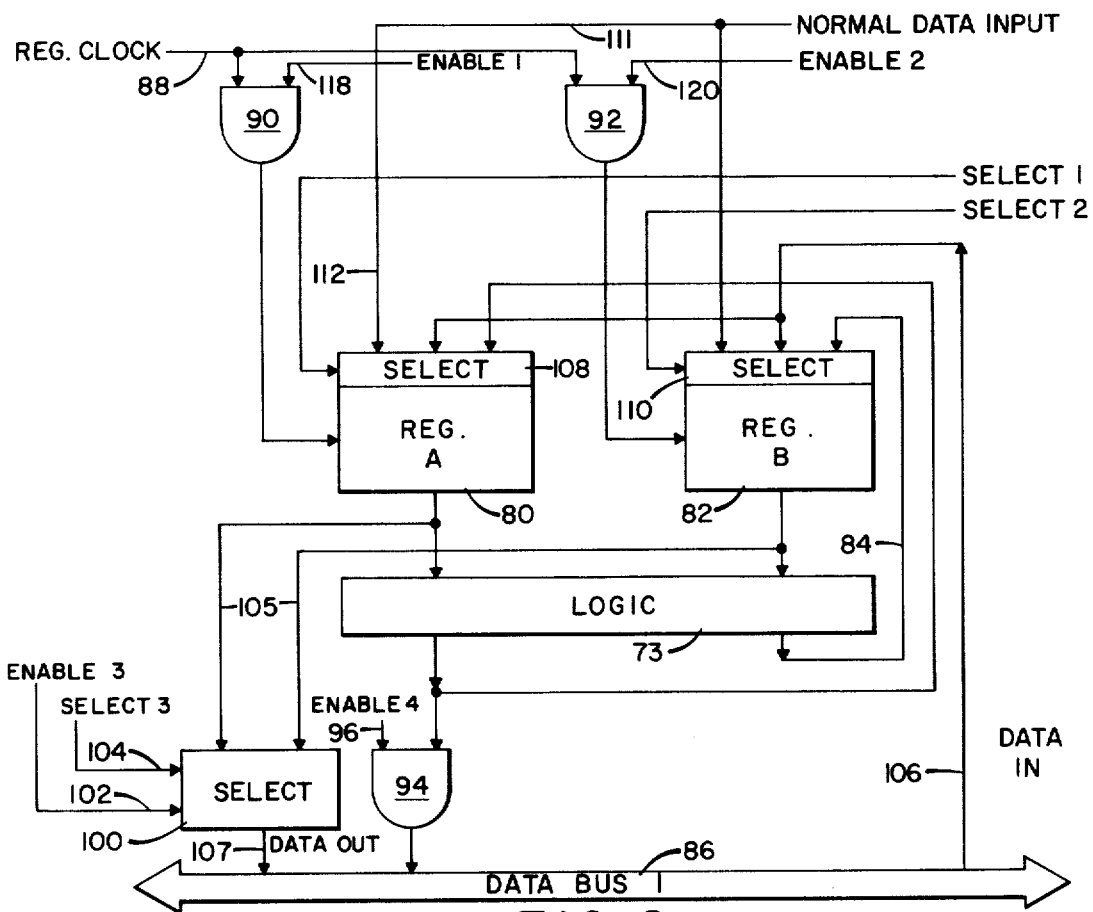
FIG. 2 is a schematic and block diagram of a portion of one of the modules in which registers within the module may be loaded, read out, or used as switching elements in accordance with decoded information from the control bus.

FIG. 2 illustrates how the contents of a particular module can be augmented to allow both retrieval and replacement of information from that module and a connecting data bus. Assume that initially there are only two storage elements, register A, 80, and register B, 82, having outputs connected to logic 73. The output of logic 73 is connected back to the registers via lines 84 and 85 and to an outside data bus 86, via AND gate 94. The clock signal on line 88 is transmitted through AND gates 90 and 92 to step the processing sequence along, with logic 73 determining the next values in registers A and B from their current values. AND gate 94 is gated by an "enable 4" signal on line 96. Note, the registers are available commercially, such as a T.I. Model 74174 hex D-Type flip flop.

To allow the contents of these registers to be put onto the data bus, a selector 100 is provided which has two control signals, "enable 3" on line 102 which indicates if "enable 3" information is to be used, and "select 3", on line 104 which indicates which of two registers is selected. Data from the registers is available on lines 105 and 107. To allow insertion of information, data bus 86 is connected via line 106 to selectors 108 and 110 that choose either the normal data input on line 111 to Register A and Register B or the data bus contents, upon command of select signals "select 1" and "select 2" delivered over lines 112 and 114. These selectors are commercially available from a number of sources, namely Signetics Model 74LS257, which is a quad 2-to-1 multiplexer. Data is strobed into the registers by control of AND gates 90 and 92 by "enable 1" and "enable 2".

For the example of FIG. 2, hardware is added to the module in order to provide access to key storage locations, where access involves both read-out and entry of information. For more powerful computational complexes, most of those routing paths are already built into the design of the building blocks, such as 2901 type of microprocessor bit slices, and only a few clock and select controls need be added.

Figure 3:
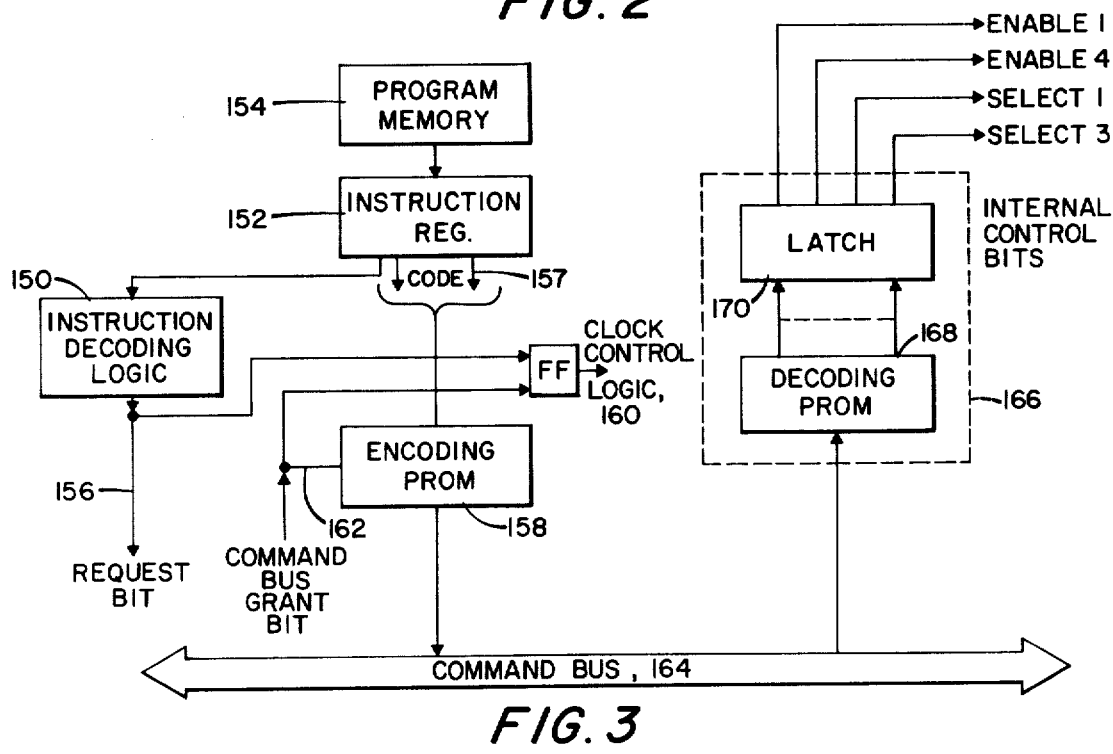
FIG. 3 is a block and schematic diagram illustrating an instruction register within one module which produces a code through encoding a PROM to place commands on a command bus, which are thereafter decoded by a PROM and a latch circuit within a second module; and, FIG. 4 is a schematic and block diagram illustrating the utilization of the circuits within a module to provide a simple switching or conduit function so as to connect, for instance, one data bus to another data bus.

FIG. 3 illustrates one version of the command bus encoding/decoding implementation. An instruction decoding logic unit 150 is coupled to an instruction register 152, which holds the contents of the last word read from a program memory 154. The instruction decoding determines that an operation requires the use of the command bus capabilities, puts out a command bus request on line 156, and feeds an instruction code generated at 157 to an encoding PROM (programmable read-only memory) 158, such as T.I. 74S471, an 8 input, 8 output PROM. At the same time, the instruction decoding logic must also halt it's own clock stepping logic 160 until its request for the command bus is granted by a grant bit signal on line 162. That grant signal allows the encoded command bus command to go onto the command bus 164 and to every command bus decoder 166, consisting of a decoding PROM 168, such as T.L. 74S471, and a latch 170, such as T.I. 74174 register. Each of the separate control signals, including all different enables and selects, are thus generated and held for the time interval that information is latched. A pipelining effect occurs in that command bus requests ae set up at one cycle, and processed the next, allowing overlap of processing one command bus operation with the set up of the next. The amount of hardware involved is quite minimal, since an encoding PROM need only be one integrated circuit (IC) for an eight bit wide command bus and a decoding PROM with a storage output need be as little as one IC for each 8 output bits. The encoding is used to provide a convenient means of mapping from a given instruction format into the chosen command bus codes. The decoding provides a means for each module to interpret a common code as is appropriate to its particular logic function. As a secondary but extremely important result, each module can be fully tested independently of the presence of all the others, provided that the module testing mechanism can sequence all the command bus codes.

Figure 4:
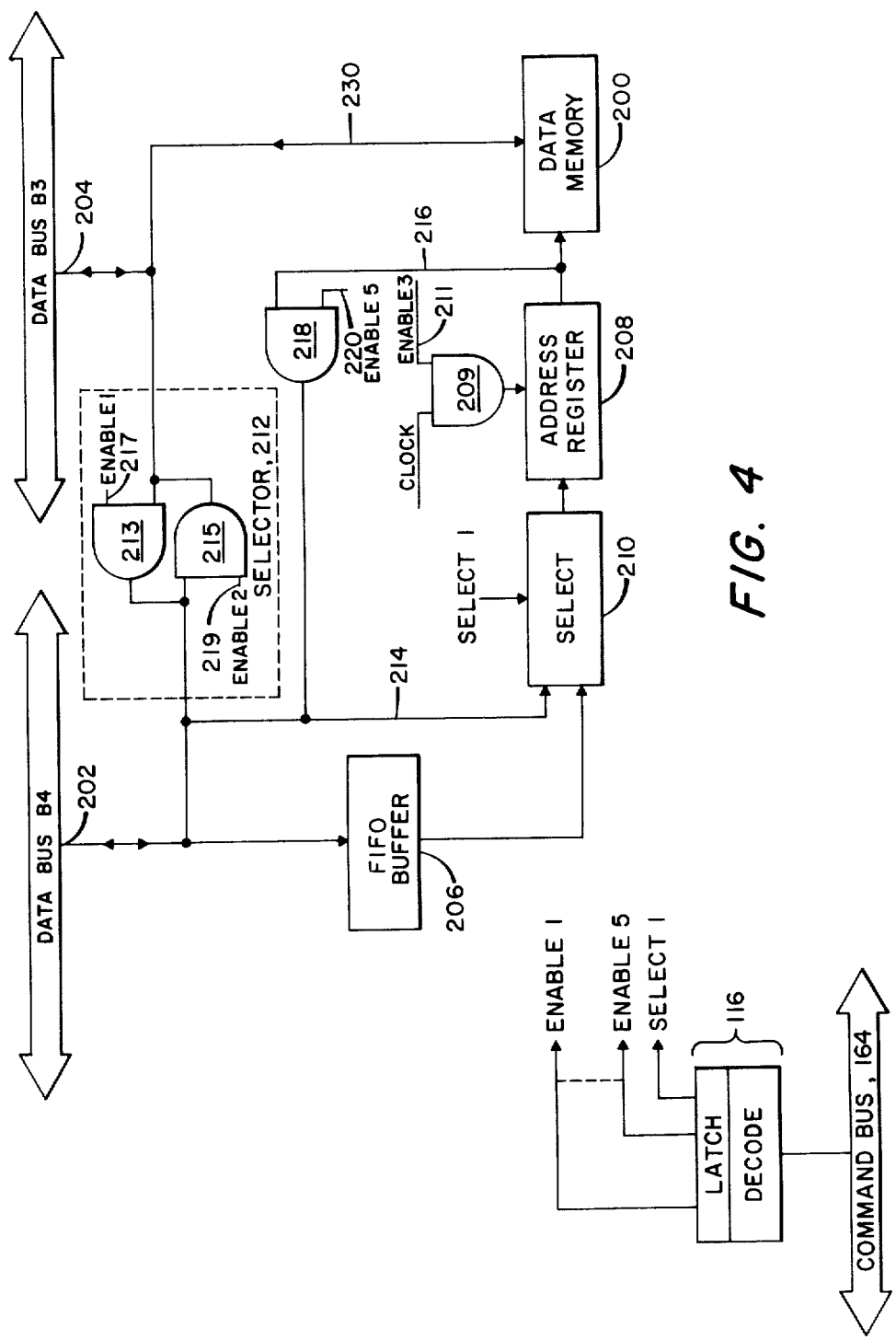

For example and referring now to FIG. 4, the M2 module can function as a conduit or switching network to connect data bus B4 to data bus B3.

FIG. 4 illustrates that module M2 may include a memory 200 with input buffering which is able to be used for connecting buses together. Module M2 may therefore include a data bus 4 connection 202, data bus 3 connection 204, a first-in, first-out (FIFO) buffer 206 connecting the inputs from data bus 4 to an address register 208 connected to data memory 200. Bus connection logic in the form of a select circuit 210 is introduced to allow data to go directly between data bus 4 and data bus 3. Since the contents of the address register is a key piece of information, it must be both loadable and readable from either data bus. Hence, there is provided a selector 212 utilizing AND gates 213 and 215 which allows information from a data bus to replace the normal register input over line 214. The output of register 208 is available on line 216. This register is clocked by enabling a gate 209 which couples clock pulses to the addresses register in accordance with a signal on line 211. For test purposes, the enable 3 signal is removed thus freezing register 108's contents. The output of addresses register 208 may be placed on a bus via enabling of an AND gate 218 via an "enable 5" signal on line 220. This output is made directly available to data bus 4 and may be switched to data bus 3 via an "enable 2" signal. Moreover, data buses 3 and 4 may be directly connected by generating "enable 1" or "enable 2" signals and applying them respectively on lines 217 and 219. Note that because of the presence of selector 212, the address register does not have to connect to both buses independently, but only to one.

Control as to the order or sequence of events is dictated by the command bus decoding logic 116. For most of the time, e.g. the normal command code situation dictates that the data bus 4 feed data into the FIFO buffer 206 at the rate indicated by controls on the FIFO input clock (not shown), while the output of the FIFO buffer becomes the addresses for data to be pulled from or put into data memory 200 by way of data bus 3 over line 230.

One example of a command code is one that specifies that this module is needed to connect bus 3 and 4 together. Then the FIFO buffer is inhibited from reading or writing. Memory 200 is also disabled, with the only enable signals being those which dictate the routing of information between buses in the proper direction.

Another command code is one which specifies a check on the contents of the memory address register via bus 4. In these circumstances, the output of FIFO buffer 206 and memory 200 can continue without interruption, while only the input to the FIFO buffer is inhibited, and the contents of memory address register 208 at the moment of request is read out onto data bus 4 via enabling of AND gate 218. This last case is an example of how information processing can be monitored without interfering with processing.

Table II presented hereinbeneath, indicates one type coding system for codes to be applied to the command bus. As can be seen from the following table, normal connections are occasioned by a code 1111. The remainder of the codes indicate the conditions of the various modules in order to initiate and accomplish the task set by the codes. This table corresponds to table I and provides more detailed information as to the functions occasioned by the placing of the indicated code on the command bus. Code 1011 corresponds to an operation in which a module is utilized as a switching circuit, whereas code 1101 indicates a diagnostic test.

TABLE II

NORMAL CONNECTIONS

Code 1111
- M1  Register contents to Bus B4
      (Controller sets up MEM/ARITH
      Operation Information)
- M2  Bus B4 to FIFO
      (Controller sets up MEM/ARITH
      Operation Information)
      Data MEM to/from BUS B3
      (MEM/ARITH Computation)
- M3  BUS B3 to/from Arithmetics
      (MEM/ARITH Computation)
- M4  Bus B2 to/from External Units
      (Host BUS monitoring, waiting for things to happen);
      BUS B4 unused.
- M5  BUS B1 to/from Side Door External Units
      (Side Door- BUS waiting for data acceptance or
      transmission): BUS 83 unused

OTHER COMMUNICATIONS

Code 1110  Controller Initiates BUS operation without
           affecting M2⇌M3 e.g. MEM/ARITH operations
- M1  Register contents to BUS B4
- M2  FIFO input disabled; Data MEM to/from BUS B3
- M3  BUS B3 to/from Arithmetics
- M4  BUS B4 to a register in M4
- M5  BUS B1 to/from External Units (BUS B4 unused)

Code 1101  Controller Supplies data to Host without affecting
           M2⇌M3 e.g. MEM/ARITH Operation
- M1  Clock halted, register in M1 to BUS B4
- M2  FIFO Input Disabled; data MEM to/from BUS B3
- M3  BUS B3 to/from Arithmetics
- M4  BUS B4 to BUS B2
- M5  BUS B1 to/from External Units (BUS B3, unused)

Code 1100  Side-Door cycle-steals Memory Interrupting
           Arithmetic (M3), but not affecting Controller
           (M1)
- M1  Register contents to BUS B4
- M2  BUS B1 to FIFO; ADR register and Data Memory clock
      halted
- M3  Arithmetic clock halted
- M4  BUS B2 to/from BUS B3
- M5  BUS B3 to BUS B1

Code 1011  Host inspects arithmetic storage values,
           interrupting controller (M1) MEM/ARITH
           (M2-M3)
- M1  Clock halted
- M2  BUS B4 to BUS B3; ADR register and
      Data Memory clock
      halted
- M3  Register contents to BUS B3
- M4  BUS B4 to BUS B2
- M5  BUS B1 to/from Side Door External Units
      (BUS B3, not used)

Code 1010  Controller initializes side door operation,
           using Memory (M2) as conduit interrupting
           MEM/ARITH (M2-M3) operation
- M1  Register contents to BUS B4
- M2  FIFO input disabled; ADR register and Data Memory
      clock halted; BUS B4 to BUS B3
- M3  Arithmetic clock halted
- M4  BUS B2 to/from External circuits(BUS B3 unused)
- M5  BUS B3 to BUS B1

Moreover, within a given module, there may be internal buses which may be configured and switched by the decoded command bus to enable registers connected to the internal buses to be switched to the external buses. This internal switching is also one of the features of the command bus structure.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a computer system which includes a number of modules which perform normal data processing functions, said system including a number of parallel data buses, each with a number of lines, with each module connected to at least one data bus via the lines thereof, each of said modules having at least one register;
   a command bus connected to each of said modules, said command bus adapted to carry commands in the form of digital coding for either interrupting this normal data processing function of a module and for establishing a switching function, or for reading out the contents of a register in an associated module;
   means within selected modules for generating said commands;
   means for establishing priority of said commands and for placing said command on said command bus in accordance with the established priority; and
   means within more than one predetermined module responsive to a command placed on said command bus for interrupting the normal data processing function of the associated module to transform it into a nonprocessor switch for either establishing a switching function in which a connection path determined by said command is established between the lines of a first and second one of said parallel data buses to permit switching of data from the lines of one data bus to the lines of another in which there is a nonprocessor transfer of data, with no data being processed in the switching operation, of for reading out the contents of a register in said associated module to a temporarily unused data bus.

2. The system of claim 1 wherein said priority establishing means includes means for placing a normal code on said command bus when no commands are generated within a module.

3. The system of claim 1 wherein said predetermined modules are taken from a group consisting of a controller, a host computer interface and/or a side door interface.

4. The system of claim 1 wherein each of said modules includes a decoding unit.

5. The system of claim 1 wherein each of said decoding units includes a PROM, and a latch circuit coupled thereto.

6. The system of claim 1 wherein said interrupting means includes means for freezing the operation of said register.

7. The system of claim 1 wherein said means for establishing a predetermined connection path includes a bidirectional gate, the direction of which is specified by commands on said command bus, input/output terminals at the corresponding modules connected to said first and second data buses, and means for connecting said bidirectional gate to bridge across said input/output terminals.

8. The system of claim 1 wherein said last mentioned means includes a buffer coupled to said first data bus; means for selecting between signals on said first data bus and the output of said buffer; a register coupled to the output of said selecting means; unidirectional gate means for selectively coupling the output of said register to said first bus; bidirectional gate means for selectively coupling said first and second data buses together, and means for freezing the output of said register.

9. The system of claim 1 wherein said fixed number of data buses is four.

10. The system of claim 9 wherein said four data buses normally function respectively as a controller information bus, an arithmetic unit memory bus, a host computer input/output bus and a side door outside bus.

* * * * *

UNITED STATES PATENT AND TRADEMARK OFFICE
CERTIFICATE OF CORRECTION

PATENT NO. : 4,462,029
DATED : July 24, 1984
INVENTOR(S) : Leopold Neumann et al It is certified that error appears in the above—identified patent and that said Letters Patent is hereby corrected as shown below:

Column 3, line 15, "This," should read --Thus,--.

Column 4, line 21, "18 and 30," should read --18 and 20,--;
  lines 39-40, "hardware link" should read --hardwire link--.

Column 6, line 50, "hardware link 34" should read --hardwire link 34--;
  line 53, "hardware link 32." should read --hardwire link 32.--.

Column 7, line 53, "T.L." should read --T.I.--;
  line 58, "requests ae set" should read --requests are set--.

Column 9, line 25, "transmission): BUS 83" should read --transmission); BUS B3--.

UNITED STATES PATENT AND TRADEMARK OFFICE
CERTIFICATE OF CORRECTION

PATENT NO. : 4,462,029

DATED : July 24, 1984

INVENTOR(S) : Leopold Neumann et al

It is certified that error appears in the above—identified patent and that said Letters Patent is hereby corrected as shown below:

Column 10, line 38, "of for reading" should read --or for reading--;

line 51, "claim 1" should read --claim 4--.

*Signed and Sealed this*

*Seventh* Day of *May 1985*

[SEAL]

*Attest:*

DONALD J. QUIGG

*Attesting Officer*  *Acting Commissioner of Patents and Trademarks*